United States Patent
Nakakubo et al.

(10) Patent No.: US 6,592,479 B2
(45) Date of Patent: Jul. 15, 2003

(54) TENSIONER WITH RELIEF VALVE MECHANISM

(75) Inventors: Katsuya Nakakubo, Osaka (JP); Nobuyuki Fujimoto, Osaka (JP); Yoshio Kurokawa, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 10/002,348

(22) Filed: Oct. 26, 2001

(65) Prior Publication Data

US 2002/0052259 A1 May 2, 2002

(30) Foreign Application Priority Data

Oct. 26, 2000 (JP) .......................................... 2000-327864

(51) Int. Cl.[7] .............................. F16H 7/08; F16H 7/22
(52) U.S. Cl. ........................................ 474/109; 474/110
(58) Field of Search ................................. 474/109, 110, 474/111, 101, 135, 136, 138, 140

(56) References Cited

U.S. PATENT DOCUMENTS

| | | | |
|---|---|---|---|
| 5,879,256 A | * 3/1999 | Tada | 474/110 |
| 6,193,623 B1 | * 2/2001 | Koch et al. | 474/110 |
| 6,322,468 B1 | * 11/2001 | Wing et al. | 474/110 |
| 6,361,458 B1 | * 3/2002 | Smith | 474/109 |
| 6,383,103 B1 | * 5/2002 | Fujimoto et al. | 474/110 |
| 6,398,682 B1 | * 6/2002 | Suzuki et al. | 474/110 |
| 6,435,993 B1 | * 8/2002 | Tada | 474/110 |

FOREIGN PATENT DOCUMENTS

EP 0 483564 A1 * 5/1992

* cited by examiner

*Primary Examiner*—Marcus Charles
(74) *Attorney, Agent, or Firm*—Dann, Dorfman, Herrell and Skillman; Henry H. Skillman

(57) ABSTRACT

A plunger equipped with a relief valve mechanism is slidably mounted in a tensioner housing. The relief valve mechanism has a valve spring disposed between a valve and a spring retainer plug in a compressed condition. The spring retainer plug has a stopper surface formed on the side which opposes the valve. The maximum displacement of the valve and the maximum amount of compression of the valve spring are defined by the stopper surface so that the maximum shear stress acting in a wire of the valve spring is less than a fatigue limit of the valve spring wire.

1 Claim, 5 Drawing Sheets

TENSIONER WITH RELIEF VALVE MECHANISM

BACKGROUND OF THE INVENTION

1. Field of the Invention

The present invention relates to a tensioner used to apply a proper tension to a timing belt, timing chain or the like of an automobile engine.

2. Description of the Related Art

Tensioners are widely used for a timing belt or a timing chain which transmits rotation from a crankshaft of an engine to camshafts, in order to prevent the timing belt or the timing chain from vibrating when the vehicle is running, and to keep a proper tension of the timing belt or chain.

FIG. 8 shows a chain transmitting device of an engine in which such a tensioner is incorporated. The tensioner 310 is mounted on the engine adjacent to a slack side of a chain 320 which is stretched between a driving sprocket 314 driven to rotate by a crankshaft 312 of the engine and a driven sprocket 318 fixed on a camshaft 316 of the engine.

The tensioner 310 has a plunger 324 slidably received for reciprocation in a tensioner housing 322 with one end portion protruding from a front surface of the housing 322. The plunger 324 forces the back surface of a tensioner lever 328 at a position near a free end of the tensioner lever 328 which is pivotally supported at the opposite end a pivot shaft 326 secured to the engine body, so that a shoe surface 330 of the tensioner lever 328 is urged into sliding contact with the slack side of the chain 320 thereby to apply a tension to the chain 320.

Japanese Patent Laid-open Publication No. 2000-240744 discloses an example of such tensioners. FIG. 1 of this publication shows a plunger installed in a tensioner housing freely slidably, with a high pressure oil chamber being formed by the housing and the inside of the plunger. The plunger is installed so as to be urged in the protruding direction by a plunger spring, and has a plug mounted at a front end of the plunger.

Provided between the housing and the high pressure oil chamber is a check valve mechanism which has a check ball that allows oil to flow into the high pressure oil chamber and prevents the oil from flowing out from the high pressure oil chamber. The high pressure oil chamber is filled with oil which is continuously supplied from an oil source through an oil supply passage and the ball check valve mechanism.

An auxiliary oil chamber communicating with the high pressure oil chamber via an oil passage is formed in the plunger. The auxiliary oil chamber has a valve installed therein which is urged in the plunging direction by a valve spring, while the plunger has a discharge port which opens when the valve slides against the force of the valve spring, thereby constituting a relief valve mechanism.

In the known tensioner described above, oil pressure in the high pressure oil chamber increases when the chain runs and the plunger receives a load applied by the chain in the direction opposite to the urging direction of the plunger spring. At this time, hydraulic pressure is applied to the auxiliary oil chamber where the valve of the relief valve mechanism makes contact freely slidably to the inside thereof, so that the valve retracts against the urging force of the valve spring. When the oil pressure increases further, the valve retracts further and eventually opens the discharge port which communicates with the outside, so that the oil is discharged from the auxiliary oil chamber so as to mitigate the excessive pressure in the high pressure oil chamber.

In the conventional tensioner described above, maximum displacement of the valve spring corresponds to the distance traveled before the valve and the plug make close contact with each other. While it is not necessary to displace the valve and the valve spring after the discharge port of the valve has been opened, though in case the oil pressure in the high pressure oil chamber experiences an instantaneous increase, the valve spring experiences a displacement due to inertia of the valve after the discharge port of the valve has been opened.

By the displacement of the plunger in the protruding direction, wire of the valve spring is subject to shear stress. As will be understood from the relationship between the S-N curve and the fatigue limit, the valve spring breaks due to fatigue when the wire is subjected to shear stresses of intensities higher than a certain level repetitively. As a result, there has been a problem that the relief valve mechanism fails to function.

SUMMARY OF THE INVENTION

An object of the present invention is to provide a tensioner having a relief valve mechanism wherein the maximum displacement of the valve spring of the relief valve mechanism is restrained within a range which is necessary and sufficient, and the stress acting in the wire of the valve spring is restrained within the fatigue limit.

To achieve the foregoing object, according to the present invention, there is provided a tensioner comprising: a housing; a plunger slidably mounted in the housing with one end protruding outward of the housing under the force of a plunger spring disposed inside the housing, there being a high pressure oil chamber defined between the housing and the plunger; a check valve mechanism having a check ball which allows oil to flow from the outside of the housing into the high pressure oil chamber and prevents the oil from flowing out from the high pressure oil chamber; and a relief valve mechanism having an auxiliary oil chamber which communicates with the high pressure oil chamber, a valve displaceable in a direction to enlarge and reduce the volume of the auxiliary oil chamber, a discharge port which allows the oil to flow out from the auxiliary oil chamber when the valve has moved over a predetermined stroke in the direction to enlarge the volume of the auxiliary oil chamber, and a valve spring which urges the valve in the direction to reduce the volume of the auxiliary oil chamber, the valve spring being a compression coil spring formed from a wire having a fatigue limit. The tensioner further has a protection means associated with the relieve valve mechanism for limiting a maximum shear stress acting in the wire of the valve spring below the fatigue limit when the valve has been displaced so as to open the discharge port.

In the tensioner described above, oil pressure in the high pressure oil chamber increases when a chain used with the tensioner runs and the plunger receives a load applied by the chain in the direction opposite to the urging direction of the plunger spring, since the check valve mechanism prevents the oil from flowing out from the high pressure oil chamber. At this time, oil pressure equal to that in the high pressure oil chamber is applied to the auxiliary oil chamber. When the force which is the product of the oil pressure and the sectional area of the auxiliary oil chamber becomes larger than the urging force of the valve spring, the valve starts to move in the backward or retracting direction and the valve spring begins displacement in the compressed direction, so that the impact on the plunger is suppressed. When the oil pressures in high pressure oil chamber and the auxiliary oil chamber increase, the valve retracts so as to open the discharge port which communicates with the outside, so that the oil is discharged from the auxiliary oil chamber thereby to diminish the excessive pressure in the high pressure oil chamber.

According to the invention, since the maximum shear stress acting in the wire of the valve spring is restrained by the protection means within the fatigue limit of the valve spring wire when the valve retracts to open the discharge port, the valve spring does not break even after having expanded and contracted repeatedly. This ensures that the relief valve mechanism remains functional.

In one preferred form of the present invention, the plunger has a spring retainer for retaining an end of the valve spring, and the protection means comprises a stopper surface formed on the spring retainer, the stopper surface being adapted to engage the valve when the valve has been displaced so as to open the discharge port.

The valve may have a flange-shaped enlarged head having an outside diameter larger than the outside diameter of the valve spring, the enlarged head being adapted to engage the stopper surface. The valve may further have a support boss projecting from the flange-shaped enlarged head and received in an axial hollow space of the valve spring being the compression coil spring. With this arrangement, it is possible to physically restrict the maximum displacement of the valve and the maximum stroke of the valve spring, thereby restricting the maximum shear stress acting in the valve spring wire less than, for example, the fatigue limit.

DETAILED DESCRIPTION OF THE PREFERRED EMBODIMENTS

The following description is merely exemplary in nature and is in no way intended to limit the invention or its application or uses.

Figure 1:
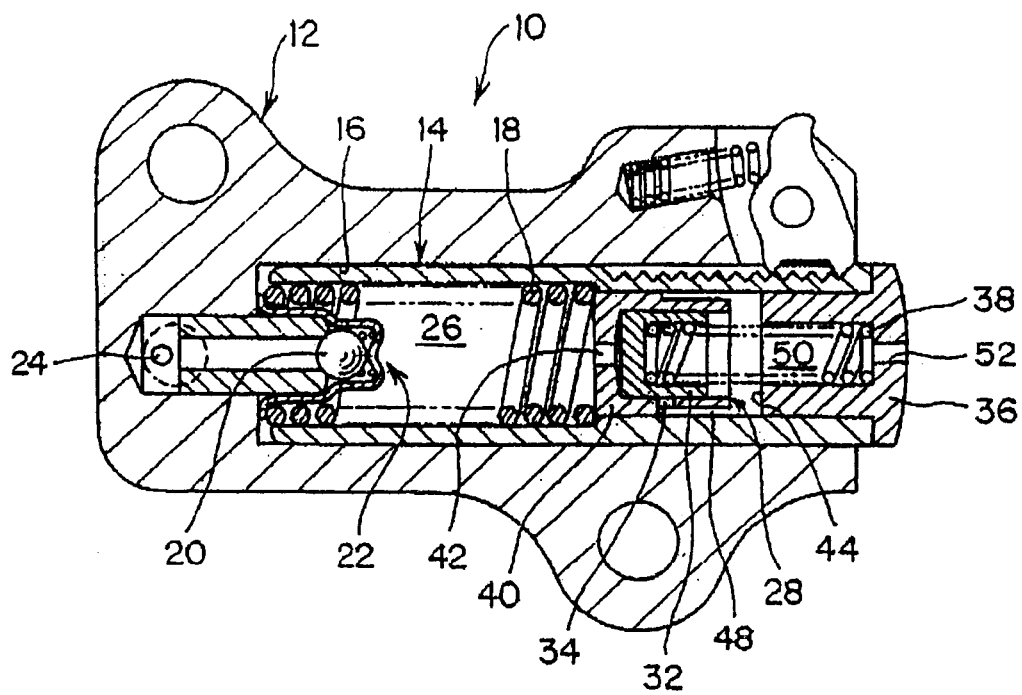
FIG. 1 is a longitudinal cross-sectional view of a tensioner with relief valve mechanism according to a first embodiment of the present invention, the view showing a valve spring as it is in the longest state.
Figure 2:
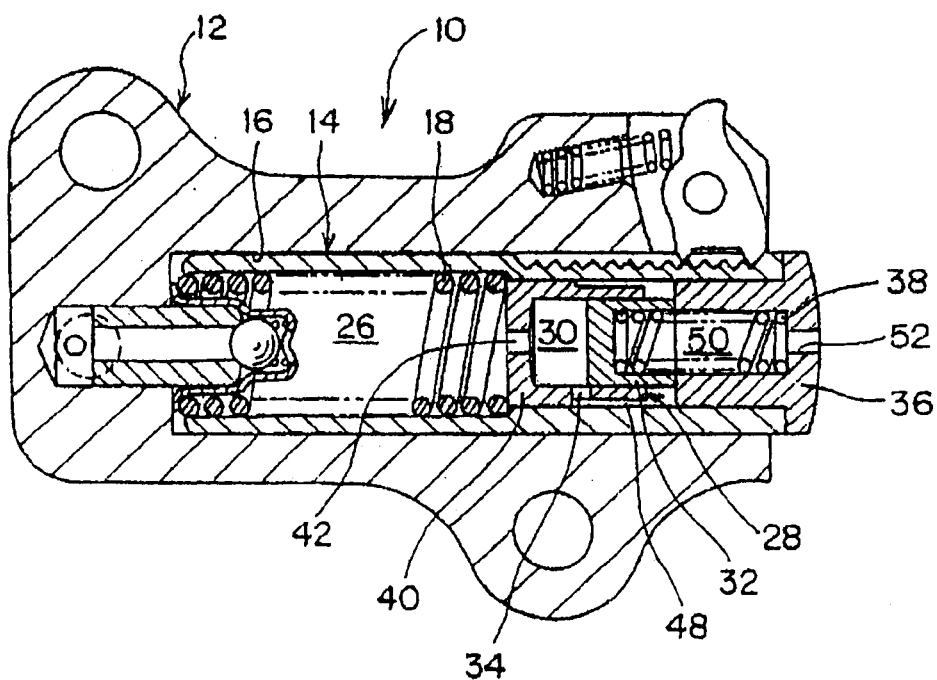
FIG. 2 is a view similar to FIG. 1, showing the tensioner with the valve spring being in the shortest state.

FIGS. 1 and 2 illustrate a tensioner with relief valve mechanism according to a first embodiment of the present invention. The tensioner 10 includes a housing 12 having a plunger-accommodation hole 16 formed therein, and a plunger 14 slidably inserted in the plunger-accommodation hole 16 for reciprocation along the axis of the hole 16. The plunger 14 is continuously urged by a plunger spring 18 which is installed in an internal space of the plunger 14, so that one end (front end) of the plunger 14 protrudes to the outside of the housing 12.

A check valve mechanism 22 having a check ball 20 is disposed at the bottom of the hole 16. The check valve mechanism 22 allows oil to flow through an oil supply passage 24 formed in the housing 12 into a high pressure oil chamber 26 and prevents the oil from flowing out from the high pressure oil chamber 26. The high pressure oil chamber 26 is defined between the inside of the plunger 14 and the housing 12. The high pressure oil chamber 26 is filled with the oil supplied from the outside of the housing 12 through the oil supply passage 24.

The plunger 14 has a relief valve mechanism 28 installed therein. The relief valve mechanism 28 has an auxiliary oil chamber 30 which communicates with the high pressure oil chamber 26, a cup-shaped valve 32 displaceable in a direction to enlarge and reduce the volume of the auxiliary oil chamber 30, a discharge port 34 which allows the oil to flow out from the auxiliary oil chamber 30 when the valve 32 has moved over a predetermined stroke in the direction to enlarge the volume of the auxiliary oil chamber 30, and a valve spring 38 which is disposed between the valve 32 and a spring retainer plug 36 in a compressed condition while being compressed and urges the valve 32 in the direction to reduce the volume of the auxiliary oil chamber 30. The valve spring 38 is a compression coil spring formed from a wire having a fatigue limit. The spring retainer plug 36 may also be constituted integrally with the plunger 14.

A hollow cylindrical sleeve 40 is press-fit in the plunger 14 from the front end thereof, and the auxiliary oil chamber 30 is formed inside the sleeve 40. The valve 32 is slidably received in the sleeve 40. The auxiliary oil chamber 30 communicates with the high pressure oil chamber 26 via an oil passage 42 formed in the sleeve 40. When the oil in the high pressure oil chamber 26 flows through the oil passage 42 into the auxiliary oil chamber 30, the valve 32 is displaced to the right in FIGS. 1 and 2 so as to enlarge the volume of the auxiliary oil chamber 30.

The spring retainer plug 36 has a cup shape and is press-fit in the plunger 14 from the front end thereof after the sleeve 40, valve 32 and the valve spring 38 have been installed in the plunger 14. The cup-shaped valve 32 and the cup-shaped spring retainer plug 36 are substantially equal in the inside diameter. The valve spring 38 is inserted in the respective internal spaces of the cup-shaped valve 32 and spring retainer plug 36 while it is compressed between the bottoms of the internal spaces.

The discharge port 34 is formed in the sleeve 40. One end of the discharge port 34 opens to an inside surface of the sleeve 40 on which the valve 32 slides. When the auxiliary oil chamber 30 is enlarged or reduced in volume in response to displacement of the valve 32, the discharge port 34 opens or closes with respect to the auxiliary oil chamber 30. The other end of the discharge port 34 opens into an oil groove 48 which is provided between the plunger 14 and the sleeve 40. In the illustrated embodiment, the oil groove 48 is formed in an outer surface of the sleeve 40. Formed inside the plunger 14 is an oil reservoir 50 between the spring retainer plug 36 and the sleeve 40. The oil groove 48 communicates with the oil reservoir 50. The cup-shaped spring retainer plug 36 has a discharge port 52 formed in a bottom wall thereof for discharging the oil from the oil reservoir 50, the bottom wall forming the front end of the plunger 14. The cup-shaped retainer plug 36 serves also as an end plug of the plunger 14.

The spring retainer plug 36 has a stopper surface 44 formed on the side thereof which opposes the valve 32. In case the spring retainer plug 36 is constituted integrally with the plunger 14, a step is formed between an inner circumference of the plunger which is press-fit with the sleeve 40 and an inner circumferential surface of the plunger 14 which retains the outer circumference of the valve spring 38, and the stopper surface 44 is formed on the step.

As the cup-shaped valve 32 is displaced, an open end of the cup-shaped valve 32 comes in contact with the stopper surface 44. The maximum displacement of the valve 32 and the maximum amount of compression of the valve spring 38 are equal to the distance between an end face at the open end of the cup-shaped valve 32 and the stopper surface 44 of the spring retainer plug 36. According to the present invention, the maximum displacement of the valve 32 and the maximum amount of compression of the valve spring 38 are related to the displacement of the valve 32 which is achieved when the valve 32 opens the discharge port 34. That is, when the valve 32 opens the discharge port 34 even slightly, the valve 32 becomes unable to make further displacement and the valve spring 38 cannot contract any more. However, the maximum displacement of the valve 32 and the maximum amount of compression of the valve spring 38 may also be set in such a way as the end face of the valve 32 abuts on the stopper surface 44 of the spring retainer plug 36 when the valve 32 fully opens the discharge port 34.

Figure 3:
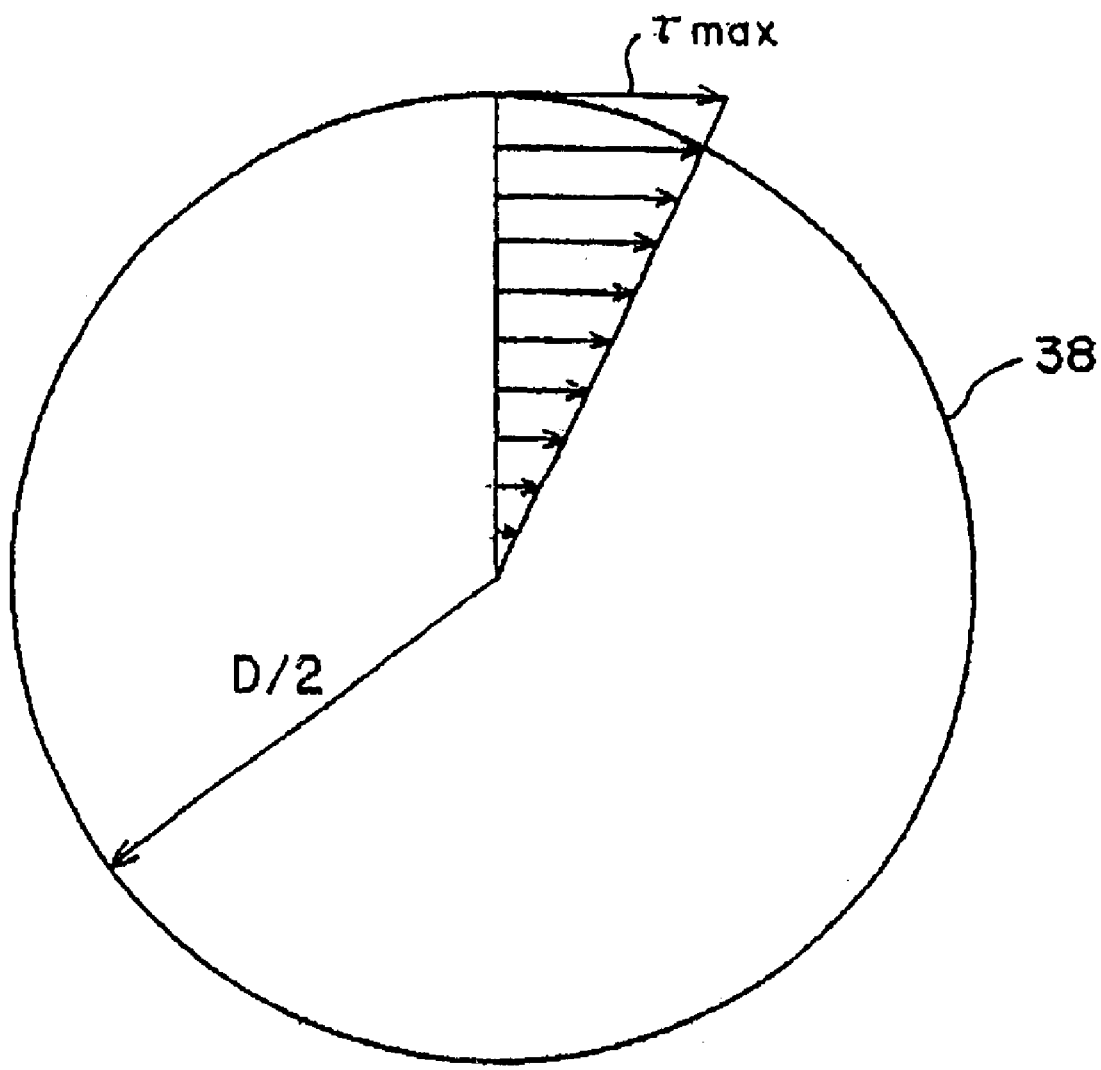
FIG. 3 is a diagrammatical view illustrative of the distribution of a shear stress acting in a wire of the valve spring.

FIG. 3 shows the shear stress $\tau$ acting in the wire when the valve spring 38 contracts. Cross section of the valve spring 36 may be either circular or any other shape. When the wire of the valve spring 38 has a circular cross section, the shear stress becomes maximum on the outer circumference of the wire. It is preferable that the maximum shear stress $\tau max$ is less than the fatigue limit of the wire of the valve spring 36 when the valve 32 opens the discharge port 34. In other words, the maximum shear stress $\tau max$ is preferably less than the fatigue limit of the valve spring wire when the valve 32 makes contact with the stopper surface 44 of the spring retainer plug 36. This solves the problem of fatigue breakage without generating a shear stress which is larger than the fatigue limit of the wire of the valve spring 38 even when the valve 32 has made displacements repeatedly.

Figure 4:
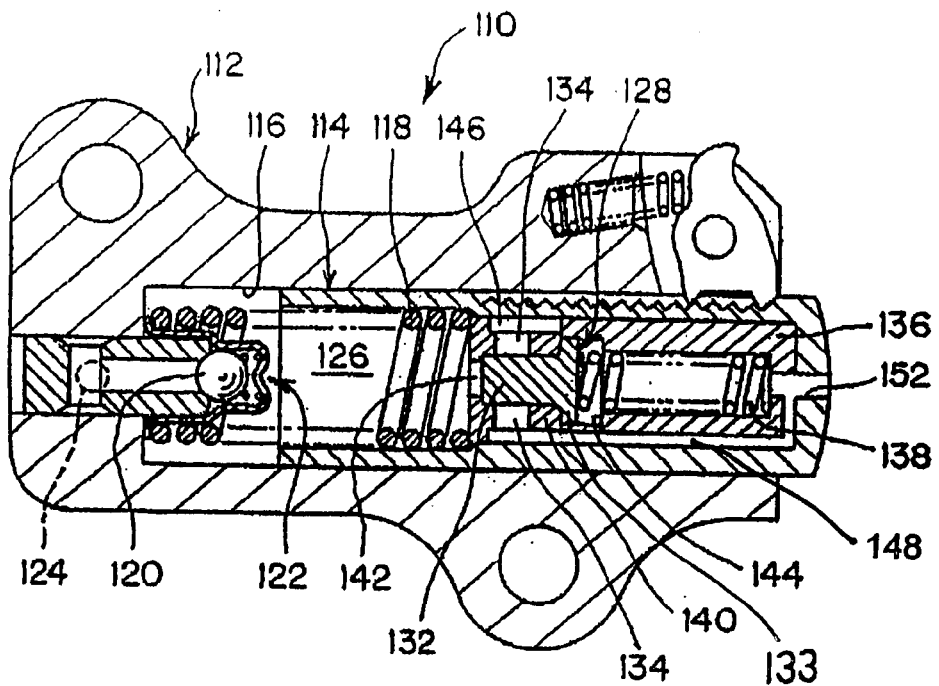
FIG. 4 is a longitudinal cross-sectional view of a tensioner with relief valve mechanism according to a second embodiment of the present invention, the view showing a valve spring as it is in the longest state.
Figure 5:
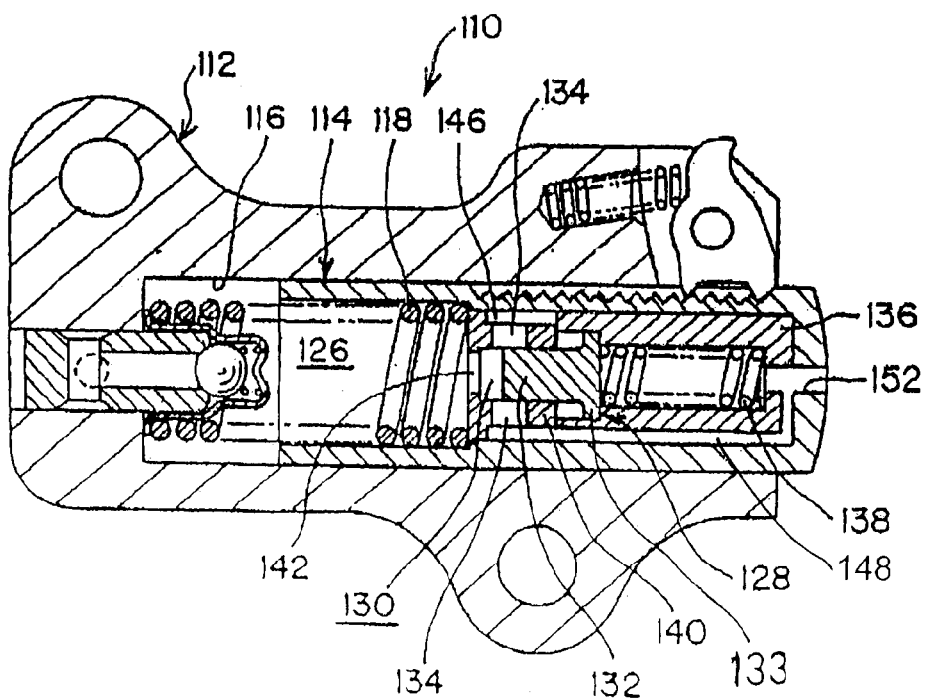
FIG. 5 is a view similar to FIG. 4, showing the tensioner with the valve spring being in the shortest state.

FIGS. 4 and 5 show a tensioner with relief valve mechanism according to a second embodiment of the present invention. The tensioner 110 includes a housing 112 having a plunger-accommodation hole 116 formed therein, and a plunger 114 slidably inserted in the plunger-accommodation hole 116 for reciprocation along the axis of the hole 116. The plunger 114 is continuously urged by a plunger spring 118 which is installed in an internal space of the plunger 114, so that one end (front end) of the plunger 114 protrudes to the outside of the housing 112.

A check valve mechanism 122 having a check ball 120 is disposed at the bottom of the hole 116. The check valve mechanism 122 allows oil to flow through an oil supply passage 124 formed in the housing 112 into a high pressure oil chamber 126 and prevents the oil from flowing out from the high pressure oil chamber 126. The high pressure oil chamber 126 is defined between the inside of the plunger 114 and the housing 112. The high pressure oil chamber 126 is filled with the oil supplied from the outside of the housing 112 through the oil supply passage 124.

The plunger 114 has a relief valve mechanism 128 installed therein. The relief valve mechanism 128 has an auxiliary oil chamber 130 which communicates with the high pressure oil chamber 126, a solid-cylindrical valve 132 displaceable a direction to enlarge and reduce the volume of the auxiliary oil chamber 130, a discharge port 134 through which the oil flows out of the auxiliary oil chamber 130 when the valve 132 has moved over a predetermined stroke in the direction to enlarge the volume of the auxiliary oil chamber 130, and a valve spring 138 which is disposed between the valve 132 and the spring retainer plug 136 in a compressed condition and urges the valve 132 in the direction to reduce the volume of the auxiliary oil chamber 130. The valve spring 138 is a compression coil spring formed from a wire having a fatigue limit. The spring retainer plug 136 may also be constituted integrally with the end plug of the plunger 114 similarly to the case of the first embodiment.

A sleeve 140 which supports the valve 132 freely slidably is press-fit in the plunger 114 from the open end thereof and firmly fitted therein, and the auxiliary oil chamber 130 is formed inside the sleeve 140. The auxiliary oil chamber 130 communicates with the high pressure oil chamber 126 via an oil passage 142 formed in the sleeve 140. When the oil in the high pressure oil chamber 126 flows through the oil passage 142 into the auxiliary oil chamber 130, the valve 132 is displaced to the right in FIGS. 4 and 5 so as to enlarge the volume of the auxiliary oil chamber 130.

The spring retainer plug 136 has a hollow cylindrical shaped with one end closed and is press-fit in the plunger 114 from the open end (left end in FIGS. 4 and 5) thereof before the sleeve 140, the valve 132 and the valve spring 138 are installed in the plunger 114. The spring retainer plug 136 has a first hollow portion and a second hollow portion separated from the first hollow portion by a step 144. The step 144 forms a stopper surface as will be described later. The first hollow portion has an inside diameter slightly larger than the outside diameter of the valve spring 138 and accommodates therein the valve spring 138. The second hollow portion supports a flange-shaped enlarged head 133 of the valve 132 freely slidably.

The valve spring 138 is disposed in a compressed condition between a flat end face of the enlarged head 133 of the valve 132 and the bottom face of the first hollow portion of the spring retainer plug 136. The flange-shaped enlarged head 133 of the valve 132 has an outside diameter larger than the outside diameter of the valve spring 138, so that it can provide a surface which opposes the step (stopper surface) 144 of the spring retainer plug 136.

The discharge port 134 is formed in the sleeve 140. One end of the discharge port 134 opens to an inner surface (valve sliding surface) of the sleeve 140. When the valve 132 is displaced while being guided by the sleeve 140 and the spring retainer plug 136 so that the auxiliary oil chamber 130 is enlarged or reduced in volume, the discharge port 134 opens or closes with respect to the auxiliary oil chamber 130. The other end of the discharge port 134 opens into an oil reservoir 146 which surrounds the sleeve 140. Formed between the plunger 140 and the spring retainer plug 136 is an oil groove 148 which communicates with the oil reservoir 146. In the illustrated embodiment, the oil groove 148 is formed in outer surfaces of the sleeve 140 and spring retainer plug 136. A discharge port 152 is formed in respective closed end walls of the of the spring retainer plug 136 and plunger 114 for discharging the oil from the oil reservoir 146 through the oil groove 148.

The spring retainer plug 136 has a stopper surface 144 formed at the step between the first hollow portion and the second hollow portion, the stopper surface 144 facing the end face of the flange-shaped enlarged head 133 of the valve 132. In case the spring retainer plug 136 is constituted integrally with an end plug of the plunger 114, a step is formed between an inner circumference of the plunger which is press-fit with the sleeve 140 and an inner circumferential surface of the plunger 114 which retains the outer circumference of the valve spring 38, and the stopper surface 144 is formed on the step.

As the valve 132 is displaced, the flange-shaped enlarged head 133 of the valve 132 departs from the sleeve 140 and comes in contact with the stopper surface 144. The maximum displacement of the valve 132 and the maximum amount of compression of the valve spring 138 are equal to the distance between the end face of the enlarged head 133 of the valve 132 and the stopper surface 144 of the spring retainer plug 136. The maximum displacement and the maximum amount of compression are also equal to the possible displacement of the flange-shaped enlarged head 133 of the valve 132 permitted between the sleeve 140 and the spring retainer plug 136.

In this embodiment, the maximum displacement of the valve 132 and the maximum amount of compression of the valve spring 138 are related to the displacement of the valve 132 which is achieved when the valve 132 opens the discharge port 134. That is, when the valve 132 opens the discharge port 134 even slightly, the valve 132 becomes unable to make further displacement and the valve spring 138 cannot contract any more. However, the maximum displacement of the valve 132 and the maximum amount of compression of the valve spring 138 may also be set in such a way as the end face of the enlarged vale head 133 abuts on the stopper surface 144 of the spring retainer plug 136 when the valve 132 fully opens the discharge port 134.

Figure 6:
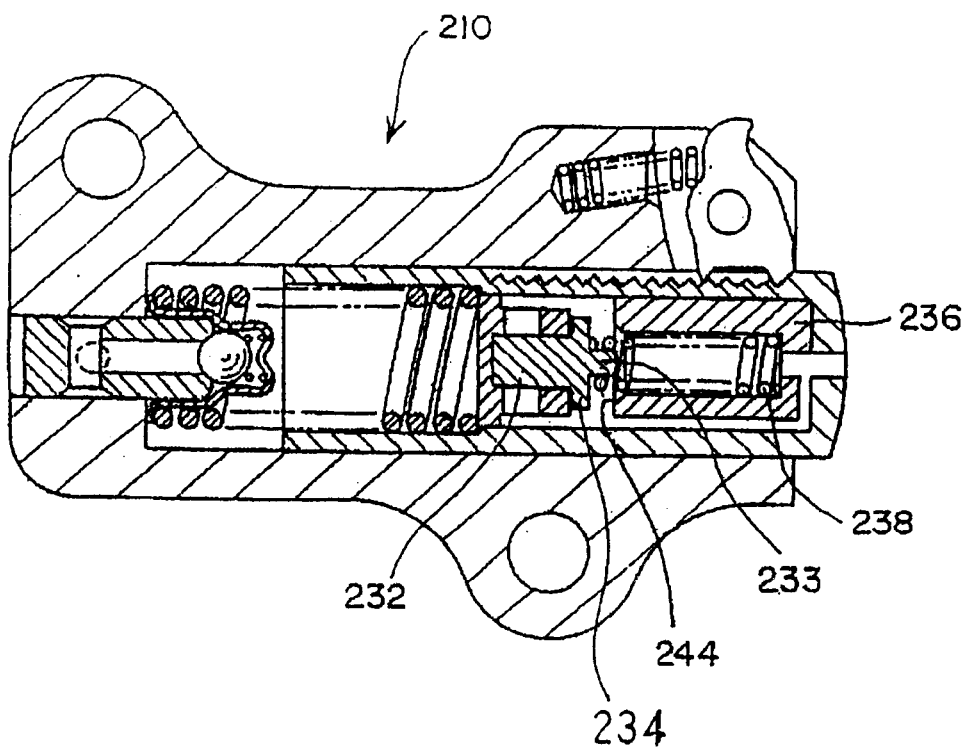
FIG. 6 is a longitudinal cross-sectional view of a tensioner with relief valve mechanism according to a third embodiment of the present invention, the view showing a valve spring as it is in the longest state.
Figure 7:
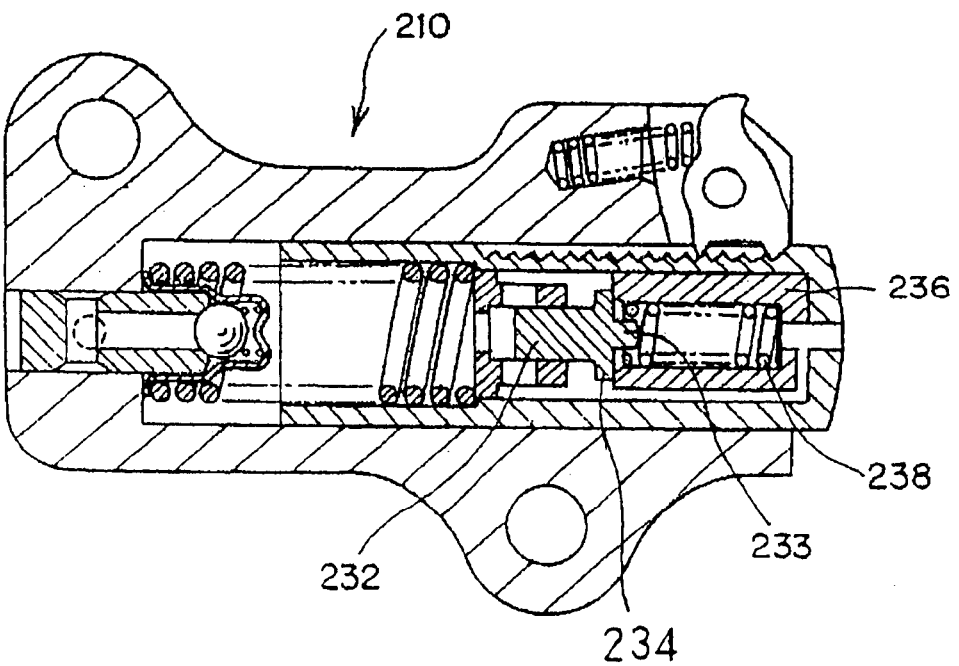
FIG. 7 is a view similar to FIG. 6, showing the tensioner with the valve spring being in the shortest state.
Figure 8:
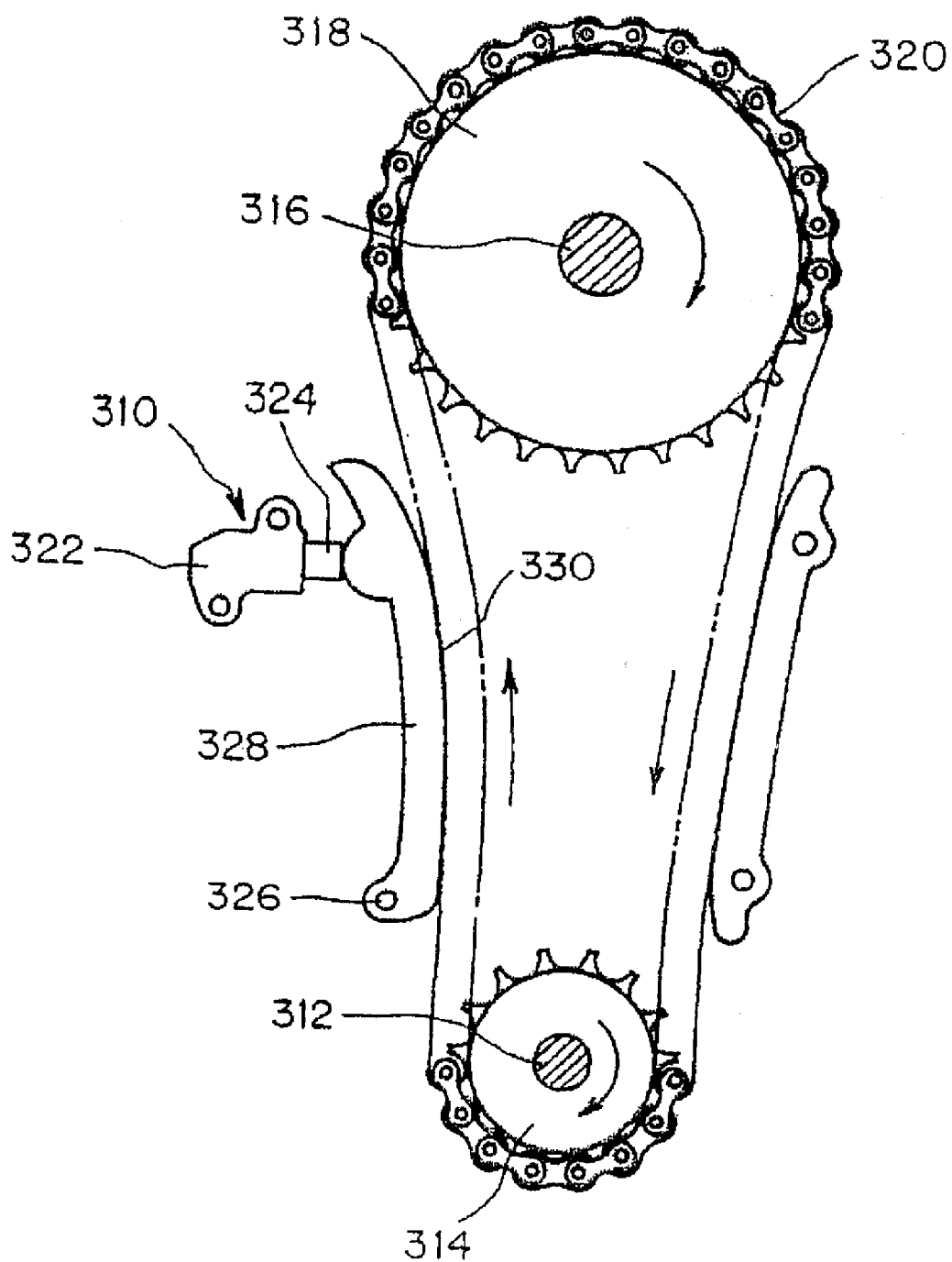
FIG. 8 is a front view of a portion around the engine illustrating an example of using the tensioner.

FIGS. 6 and 7 show a tensioner 210 with relief valve mechanism according to a third embodiment of the present invention. This embodiment is a modification of the tensioner of the second embodiment shown in FIGS. 4 and 5, and description given below will be focused on differences from the second embodiment. A valve 232 having a flange-shaped enlarged head 134 further has a support boss 233 projecting from an end face of the flange-shaped enlarged head 234 for supporting the inside surface of a valve spring 238. The valve spring 238 is a compression coil spring formed from a wire having a fatigue limit. A spring retainer plug 236 has a hollow portion which opens toward the valve 232. The valve spring 238 is disposed in a compressed condition between the end face of the enlarged valve head 234 and a bottom wall of the hollow portion of the spring retainer plug 236 with the support boss 233 being received inside the valve 232.

The spring retainer plug 236 has a stopper surface 244, which opposes the end face of the enlarged valve head 234. When the valve 232 is displaced, an outer peripheral edge portion of the end face of the enlarged valve head 234 comes in contact with the stopper surface 244 of the spring retainer plug 236, thereby setting the maximum displacement of the valve 232 and the maximum amount of compression of the valve spring 238.

While the preferred embodiments described so far exemplify the tensioner having a relief valve mechanism assembled inside the plunger, the present invention can also be applied to a tensioner which has a relief valve mechanism installed in the housing.

The drawings show an example having a ratchet mechanism for preventing backward movement of the plunger where pawls of a ratchet pivoted on the housing mesh with ratchet teeth formed on the plunger, although such a mechanism may be omitted.

As described above, since the protection means associated with the relief valve mechanism limits the maximum shear stress applied in the wire of the valve spring within the fatigue limit of the valve spring wire when the valve retracts so as to open the discharge port, the valve spring does not break even after having expanded and contracted repeatedly due to the valve displacements, so that the relief valve mechanism and the tensioner remain functional.

By virtue of the stopper surface formed, as the protection means, on the spring retainer portion for abutment with the valve when the valve is displaced so as to open the discharge port, the valve spring is prevented from being compressed excessively. Thus, fatigue breakage of the valve spring can be prevented from occurring when the valve abuts on the stopper surface, by setting the maximum shear stress acting in the valve spring wire to, for example, less than the fatigue limit of the valve spring wire. As a result, the relief valve mechanism can be maintained functional and the tensioner can also be maintained functional.

The valve with a flange-shaped enlarged head having an outside diameter larger than the outer diameter of the valve spring has both the function of a seat for the valve spring and the function of the stopper surface. By using the headed valve, the maximum amount of compression of the spring can be set precisely with reference to one surface.

Obviously, various minor changes and modifications of the present invention are possible in the light of the above teaching. It is therefore to be understood that within the scope of the appended claims, the present invention may be practiced otherwise than as specifically described.

What is claimed is:

1. A tensioner comprising:

a housing;

a plunger slidably mounted in the housing with one end protruding outward of the housing under the force of a plunger spring disposed inside the housing, there being a high pressure oil chamber defined between the housing and the plunger;

a check valve mechanism having a check ball which allows oil to flow from the outside of the housing into the high pressure oil chamber and prevents the oil from flowing out through the check valve from the high pressure oil chamber;

a relief valve mechanism having an auxiliary oil chamber which communicates with the high pressure oil chamber, a valve element displaceable in one direction to enlarge the volume of the auxiliary oil chamber and in a second direction to reduce the volume of the auxiliary oil chamber, a first discharge port in said auxiliary oil chamber operable to be opened and closed by said valve element, a second discharge port in said one end of the plunger, and a groove connecting said first and second discharge ports which allows the oil to flow out from the auxiliary oil chamber and outward of the housing when the valve element has moved in said one direction over a predetermined stroke to open said first discharge port, and a valve spring having one end retained in said plunger and a second end engaging the valve element, said spring urging the valve element in the second direction to close said first discharge port, the valve spring being a compression coil spring subject to shear stress when compressed, and formed from a wire having a fatigue limit; and a spring retainer in said plunger for retaining said one end of the valve spring, protection means for limiting a maximum shear stress acting in the wire of the valve spring below the fatigue limit when the valve element has been displaced by said predetermined stroke so as to open the first discharge port, said protection means comprising a stopper surface on said spring retainer, and a flange-shaped enlarged head on said valve element having an outside diameter larger than the outside diameter of the valve spring, the enlarged head being adapted to engage the stopper surface, said valve element having a support boss projecting from the flange-shaped enlarged head and received in an axial hollow space of said compression coil spring.

* * * * *